United States Patent [19]

Miller, Jr. et al.

[11] Patent Number: 4,813,280

[45] Date of Patent: Mar. 21, 1989

[54] THERMAL PULSE FLOW METER WITH DISPOSABLE CELL

[75] Inventors: Theodore E. Miller, Jr.; Frank L. Saunders, both of Midland, Mich.

[73] Assignee: The Dow Chemical Company, Midland, Mich.

[21] Appl. No.: 33,448

[22] Filed: Apr. 1, 1987

[51] Int. Cl.⁴ .................................................. G01F 1/68
[52] U.S. Cl. ...................... 73/861.95; 73/273
[58] Field of Search .............. 73/204, 861.5, 273; 374/148, 158; 128/724, 725, 736

[56] References Cited

U.S. PATENT DOCUMENTS

| | | | |
|---|---|---|---|
| 2,938,385 | 5/1960 | Mack et al. | 374/158 |
| 2,981,108 | 4/1961 | Andersen et al. | 374/158 |
| 3,593,704 | 7/1971 | Schwab | 128/736 |
| 3,663,917 | 5/1972 | Mahmoodl | 374/158 |
| 3,703,892 | 11/1972 | Meyers | 374/158 |
| 3,833,115 | 9/1974 | Schapker | 128/736 |
| 3,903,742 | 9/1975 | Colton | 73/861.23 |
| 4,480,467 | 11/1984 | Harter et al. | 73/204 |
| 4,491,024 | 1/1985 | Miller, Jr. | 73/861.05 |
| 4,532,811 | 8/1985 | Miller, Jr. et al. | 73/861.05 |

OTHER PUBLICATIONS

Molytek Thermalpulse ® Flowmeter, copyright data 1987, sales brochure.

*Primary Examiner*—Herbert Goldstein
*Attorney, Agent, or Firm*—Timothy S. Stevens

[57] ABSTRACT

A disposable flow cell for use in a thermal pulse flow meter of the type that incorporates a pulse heated thermal probe and a detecting thermal probe. The disposable cell has two side ports covered with a stretchable film barrier. The thermal probes extend into the flow cell through the ports stretching the barrier ahead of them so that the probes can transmit and then detect thermal pulses to a fluid flowing through the flow cell while at the same time maintaining isolation between the probes and the fluid. The invention is also a thermal pulse flow meter incorporating the above cell.

1 Claim, 1 Drawing Sheet

THERMAL PULSE FLOW METER WITH DISPOSABLE CELL

FIELD OF THE INVENTION

The invention is in the field of the measurement of fluid flow and more specifically relates to a disposable flow cell for a thermal pulse flow meter and an improved thermal pulse flow meter.

BACKGROUND OF THE INVENTION

The thermal pulse flow meter described in U.S. Pat. No. 4,491,024 to Miller, Jr. and in U.S. Pat. Nos. 4,532,811 and 4,628,743 to Miller, Jr. et al. was an advancement in the art of flow measurement because, for example, it used no moving parts and was extremely accurate.

The gist of the thermal pulse flow meter is that an upstream thermal probe located in the flow cell of the flow meter is pulse heated to thereby generate a thermal pulse in the fluid flowing through the flow cell. A thermal probe located downstream in the flow cell then detects the passage of the thermal pulse. The time period between successive thermal pulses is a mathematical function of the flow rate of the fluid flowing through the flow cell. The commercial thermal pulse flow meter sold by the Molytek Corporation, also incorporates a temperature compensation thermistor probe to determine the temperature of the fluid flowing through the cell. The above mentioned patents are fully incorporated herein by reference.

When used, for example, for the flow measurement of sterile fluids for biological applications, the flow cell and thermal probes of the thermal pulse flow meter required cleaning and sterilization before use. The present invention is a solution to this and similar problems.

SUMMARY OF THE INVENTION

The invention is an improved thermal pulse flow meter comprising a flow cell which has a channel through it. The channel has an inlet end and an outlet end. The flow cell also has a first port therethrough to the channel near the inlet end, and a second port therethrough to the channel near the outlet end. A pulse heated thermal probe is positioned in the first port so that the tip of the heated thermal probe is positioned in the channel. A detecting thermal probe is positioned in the second port so that the tip of the detecting thermal probe is positioned in the channel. The improvement comprises positioning barriers across each of the ports so that the barriers sealably partition the probes from the channel and so that the the barriers conform to the tips of the probes by barrier tension. The barriers can be constructed of a stretchable material, such as rubber, so that the probes stretch the barriers ahead of them during assembly of the flow meter. The barriers can be formed from separate parts or can be formed integrally with the body of the cell.

The invention is also a disposable flow cell adapted for use in the improved flow meter as described above. The disposable flow cell comprises a body defining a flow channel therethrough, the channel having an inlet end and an outlet end. The body of the flow cell also has a first port therethrough to the channel located near the inlet end of the channel and a second port therethrough to the channel located near the outlet end of the channel. A barrier is sealably positioned across each of the ports so that when the flow cell is normally engaged with the probes, the probes extend through the ports in such a manner that the tips of the probes are positioned in the channel, so that the barriers partition the probes from the flow channel and so that the barriers conform to the tips of the probes by barrier tension. The barriers can be stretchable barriers such as barriers made from rubber. The barriers can be a separate part from the body or can be integral with the body.

DETAILED DESCRIPTION OF THE INVENTION

Figure 1:
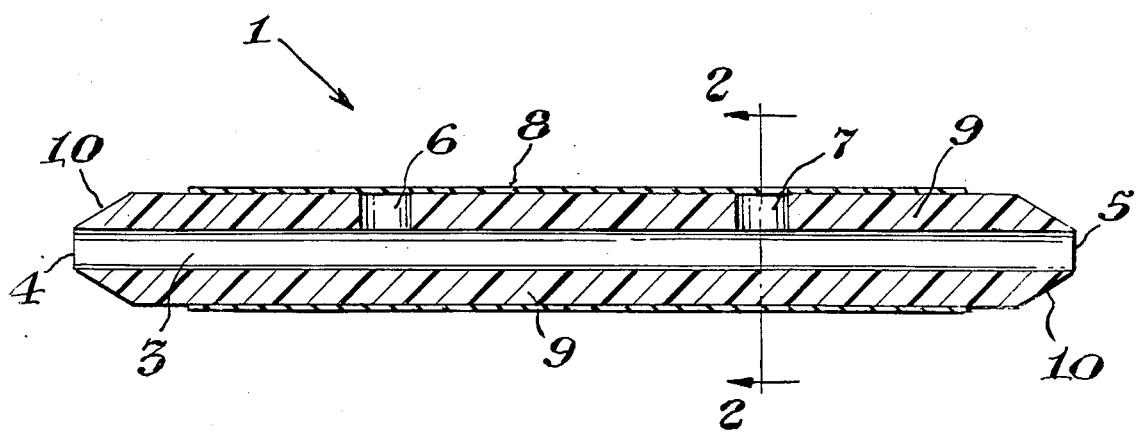
FIG. 1 shows an enlarged cross sectional view of a preferred embodiment of the invention.

Referring to FIG. 1, therein is shown an enlarged cross sectional view of a disposable flow cell 1 of the invention which is a preferred embodiment. The disposable flow cell 1 comprises a tubular body 9 defining a flow through channel 3 having an inlet end 4 and an outlet end 5. The body 9 has a first port 6 therethrough located near the inlet end 4 of the channel 3. The body 9 also has a second port 7 therethrough located near the outlet end 5 of the channel 3. A flexible tube barrier 8 is positioned around the body 9. Preferably, the tube barrier 8 is rubber such as latex rubber or silicone rubber. The body 9 terminates at each end in a standard male luer tip 10 so that each end of the body 9 can be connected to a standard female luer connection not shown. Preferably, the body 9 is molded of a plastic such as polycarbonate.

Figure 2:
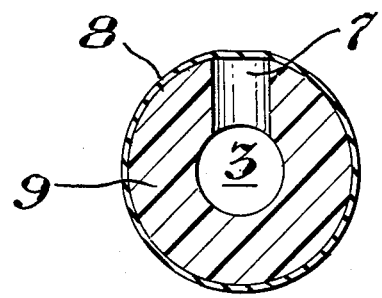
FIG. 2 shows a further enlarged cross sectional view of the cell shown in FIG. 1.

Referring to FIG. 2, therein is shown a further enlarged cross sectional view of the flow cell 1 of FIG. 1.

Figure 3:
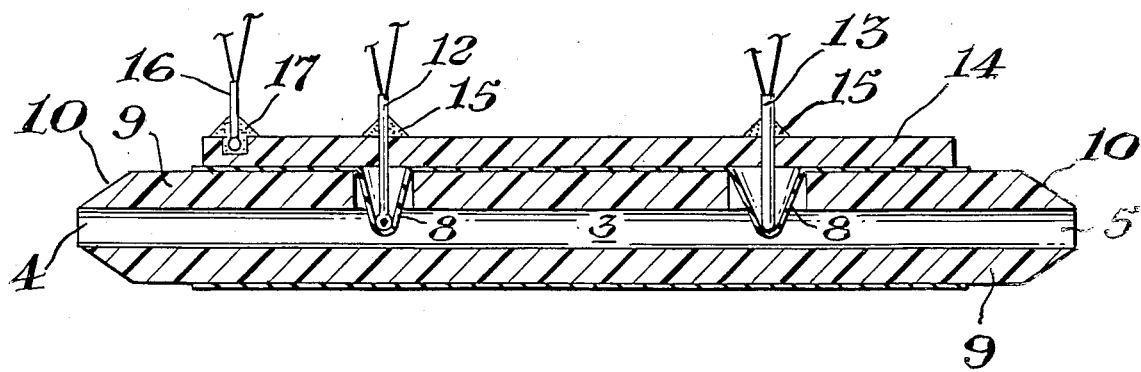
FIG. 3 shows an enlarged view of the cell of FIG. 1 normally engaged with the thermal probes of a thermal pulse flow meter.

Referring to FIG. 3, therein is shown an enlarged cross sectional view of the flow cell shown in FIG. 1 normally engaged with the heated and detecting probes of a thermal pulse flow meter. The heated probe 12 and the detecting probe 13 of a thermal pulse flow meter are permanently secured in a mount 14 with epoxy cement 15. The tip of the sending probe 12 and the tip of the detecting probe 13 have distended the flexible tube barrier 8 into the flow channel 3 so that no liquid communication can occur from the channel 3 through the ports 6 and 7 to the outside of the body 9, so that the thermal probe 12 can transmit a thermal pulse through the tube barrier 8 into a fluid flowing through the channel 3 and so that the thermal probe 13 can then detect the resulting thermal pulse through the tube barrier 8 when the thermal pulse encounters the thermal probe 13. Additionally, the stretching of the tube barrier 8 by the tips of the probes 12 and 13 helps to insure a seal between the barrier 8 and the ports 6 and 7 and insures that the barrier 8 conforms closely to the tips of the probes 12 and 13 and thins the barrier 8 at the tips of the probes 12 and 13. Preferably, the tube barrier 8 is thin so that the heat pulses can be readily transmitted and detected. The critical nature of a thin barrier 8 that closely conforms to the tips of the probes 12 and 13 can be understood by reference to U.S. Pat. No. 4,491,024. The thinner the barrier 8, the smaller would be the additional increase in the "K" factor caused by the increased time for the thermal pulse to travel from the tip of the probe 12 through the barrier 8 and then into the liquid in the channel 3. The thinner the barrier 8, the better the detecting probe 13 can sense the passing transient thermal pulse. Preferably, the barrier 8 is about 0.05 inches thick or less. More preferably the barrier 8 is about 0.02 inches thick or less. Most preferably the barrier 8 is about 0.005 inches thick or less. In addition to being thin, the barrier 8 needs to be under tension at the tips of the probes 12 and 13 so that the barrier 8 closely conforms to the tips of the probes 12 and 13 so that the thermal pulse can be efficiently transmitted and detected through the barrier 8. The temperature compensation probe 16 from the flow meter is secured to the mount 14 with epoxy cement 17.

Several alternatives to the use of the tube barrier 8 are believed to be generally equivalent. For example, it should be possible to heat seal or adhesively seal flexible disks across the ports 6 and 7. Another approach that is believed to be feasible would be to mold a thin barrier integral with the body 9 across the ports 6 and 7 from a molding material that would be stretchable in thin section such as polyethylene. Further, yet another approach that is believed to be feasible would be to mold indented thin barriers integral with the body 9 across the ports 6 and 7 from a molding material that is relatively nonstretchable in thin section such as polycarbonate plastic. In this case the dimensions of the indentations would have to closely match the dimensions of the thermal probes so that the barriers conformed to the tips of the probes by barrier tension without breaking the barrier.

EXAMPLE 1

An apparatus as generally shown in FIG. 3 is assembled. A 3.5 inch long, 1 inch outside diameter, 0.1 inch inside diameter cylinder of polycarbonate is machined at each end to form the luer tips 10 on the body 9 The ports 6 and 7 are drilled equidistant from the center of the body 9 and are spaced 1.5 inches from each other. The ports 6 and 7 are 0.094 inch in diameter. A 2 inch long latex rubber tube barrier 8 that is 0.75 inch in diameter and has a wall thickness of 0.003 inch is stretched over the body 9 so that the ports 6 and 7 are covered by the tube barrier 8. The tube 8 is obtained from a "finger cot", generally obtained from retail outlets of medical supplies.

The three thermistor probes of a Molytek Thermalpulse Flow Meter Model TPII (a pulse heated probe, a detecting probe and a temperature compensation probe) are removed from the flow meter's original flow cell. A 2.5 inch long, 1 inch inside diameter, 1.25 inch outside diameter polycarbonate tube is sawed in half lengthwise to produce two pieces, one of which is not used here. The other piece is then sawed in half lengthwise to produce two quarter round sections, one of which is not used here. Two holes are then drilled through the remaining quarter round section (called a mount 14) to receive the sending probe 12 and the detecting probe 13. The probes are secured therein by epoxy cement 15. The holes are drilled equidistant from the center of the mount 14 and are 1.15 inches from each other. The probes extend 0.5 inch from the concave surface of the mount 14. The temperature compensation probe 16 is secured within the mount 14 by the epoxy resin 17.

The mounted probes are then clamped to the disposable cell so that the sending probe 12 stretches the tube barrier 8 ahead of it through the port 6 and so that the detecting probe 13 stretches the tube barrier 8 ahead of it through the port 7. The clamp is designed to hold the cell and the mounted probes in alignment so that the probes 12 and 13 line up with the ports 6 and 7 and so that the probe tips are essentially at the axis of the flow channel 3. This example teaches how to make the invention.

EXAMPLE 2

The apparatus of Example 1 is connected to an adjustable flow rate metering pump which is pumping methanol The flow of methanol is directed into the flow channel 3 of the cell at the inlet end 4 and is conducted away from the cell from the outlet end 5. The tube barrier 8 sealably partitions the methanol from the sending and detecting probes 12 and 13. The flow rate of methanol is adjusted to be 0.80, 1.15, 1.50, 1.82, 2.14, and 2.41 ml per minute. The respective average time period (T, as described in detail in U.S. Pat. No. 4,491,024) between thermal pulses measured by the thermal pulse flow meter are 3.64, 2.98, 2.60, 2.33, 2.19, and 2.02 seconds. This data indicates that a linear relationship exists between the inverse of the flow rate and the thermal pulse period (T) and shows that the improved flow meter of the invention can be calibrated to accurately measure flow rate over a broad flow rate range despite the isolation of the methanol in the channel 3 from the thermal probes 12 and 13 by the barrier 8. This example teaches how to use the invention.

What is claimed is:

1. In an improved thermal pulse flow meter comprising a flow cell, the flow cell having a channel therethrough, the channel having an inlet end and an outlet end, the flow cell having a first port therethrough to the channel near the inlet end and a second port therethrough to the channel near the outlet end, a pulse heated thermal probe positioned in the first port so that the tip of the thermal heated probe is positioned in the channel, a detecting thermal probe positioned in the second port so that the tip of the probe is positioned in the channel, wherein the improvement comprises:

stretchable rubber barriers sealably positioned across each of the ports so that the barriers partition the probes from the channel and so that the barriers conform to the tips of the probes by barrier tension.

* * * * *

UNITED STATES PATENT AND TRADEMARK OFFICE
CERTIFICATE OF CORRECTION

PATENT NO. : 4,813,280
DATED : Mar. 21, 1989
INVENTOR(S) : Theodore E. Miller, Jr.; Frank L. Saunders It is certified that error appears in the above-identified patent and that said Letters Patent is hereby corrected as shown below:

Col. 3, line 37, after "9" insert a period (.).

Col. 4, line 4, delete "1.15" and insert --1.5--.

Col. 4, line 22, after "methanol" insert a period (.).

Signed and Sealed this

Third Day of July, 1990

Attest:

HARRY F. MANBECK, JR.

Attesting Officer

Commissioner of Patents and Trademarks